July 29, 1958  C. E. CUSHMAN ET AL  2,845,234
SAFETY APPARATUS
Filed Dec. 3, 1953  4 Sheets-Sheet 1
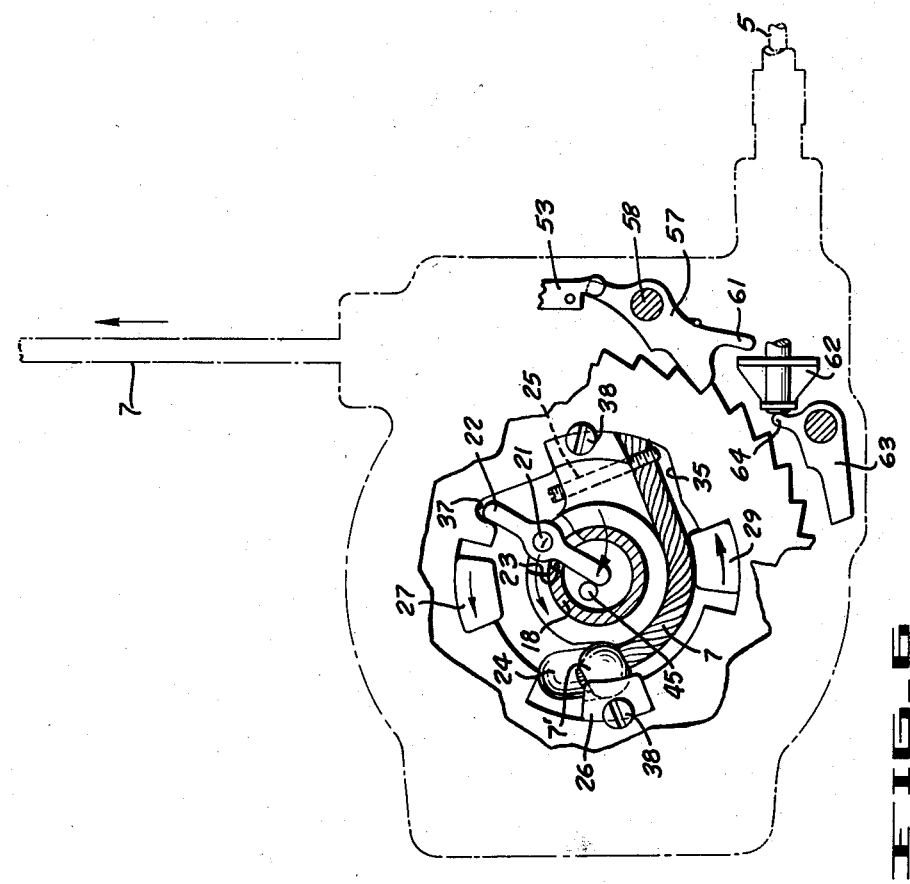
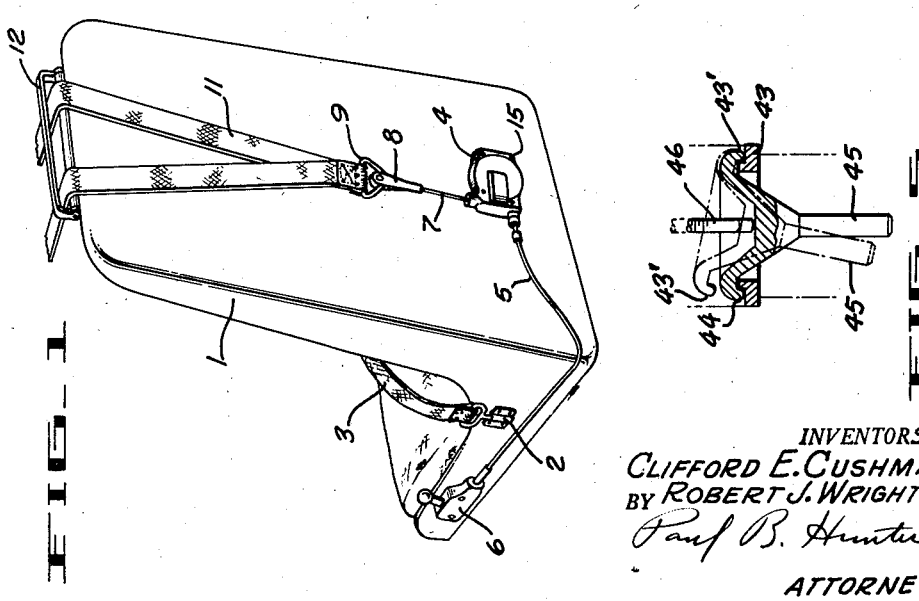
INVENTORS
CLIFFORD E. CUSHMAN
BY ROBERT J. WRIGHTON
Paul B. Hunter
ATTORNEY

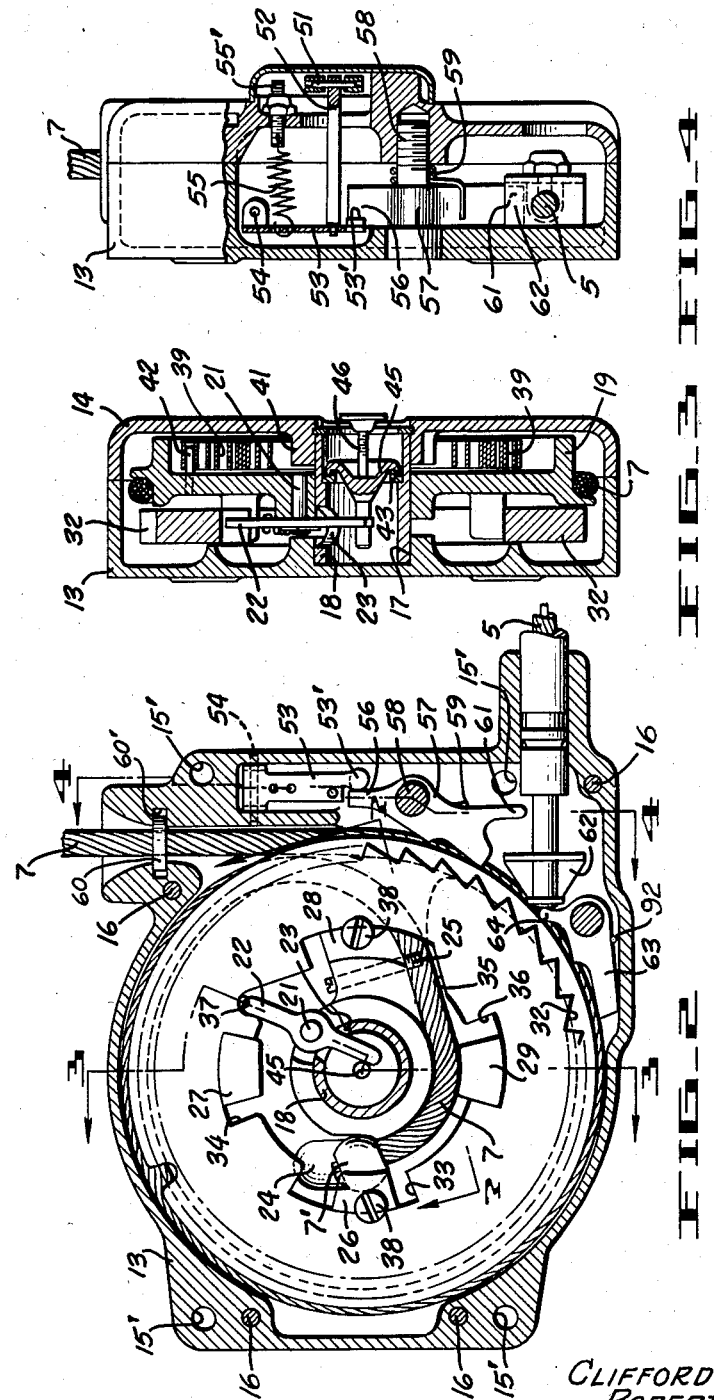

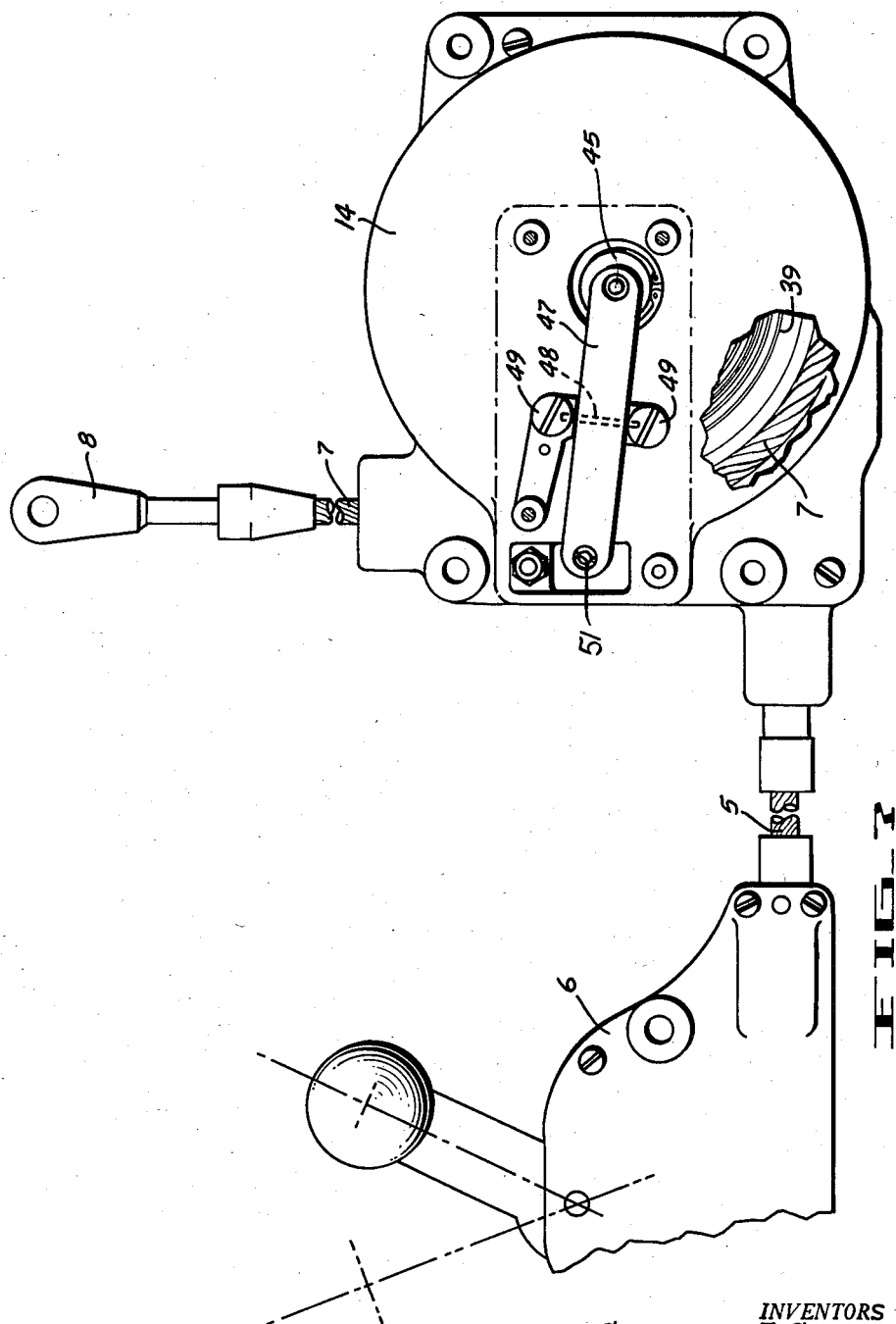

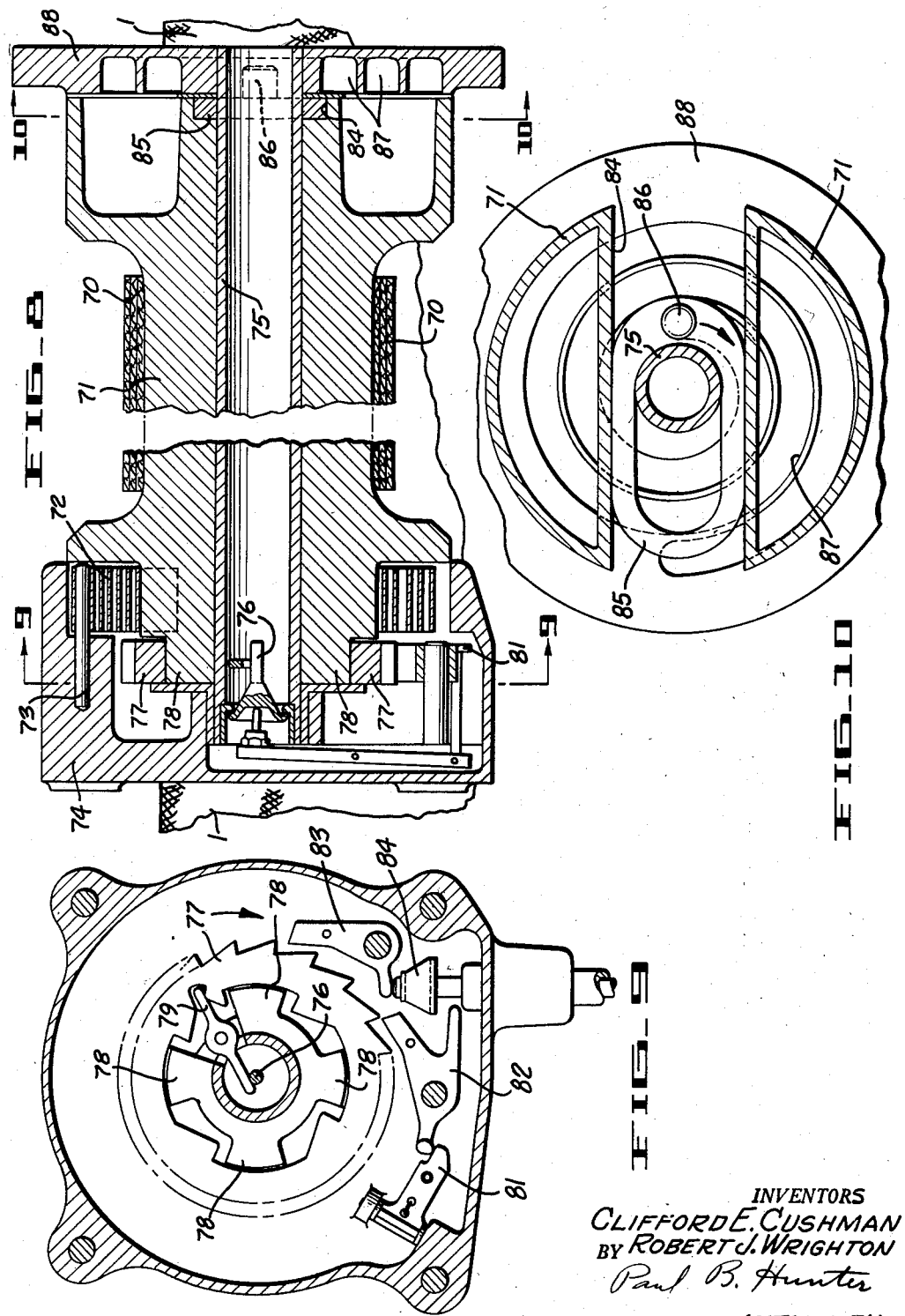

United States Patent Office 2,845,234
Patented July 29, 1958

2,845,234

SAFETY APPARATUS

Clifford E. Cushman, Burbank, and Robert J. Wrighton, Tarzana, Calif., assignors, by mesne assignments, to Pacific Scientific Aeroproducts, Glendale, Calif.

Application December 3, 1953, Serial No. 396,038

14 Claims. (Cl. 242—107.4)

This invention relates, generally, to novel safety apparatus for use in retaining persons such as pilots and passengers of rapidly moving vehicles such as aircraft and automobiles in their seats during sudden and violent motion of the person with respect to the craft due to excessive changes in velocity of such craft and, more particularly, to novel apparatus of the inertia-operated class.

In United States patent application bearing Serial Number 336,126 entitled "Safety Apparatus" filed by Leo A. Pfankuch and Robert J. Wrighton on February 10 1953, there is disclosed an inertia-operated safety device which operates directly in response to the tensions exerted on the cable of the device. These forces are applied to the cable through the pilot's shoulder harness by movements of his body, the device operating to secure the pilot in his seat during crashes and the like. This present invention discloses a novel type of such inertia-operated device which embodies several improvements over the safety device disclosed in the above-cited application and other inertia-operated devices known in the art.

One object of the present invention is to provide a novel inertia-operated safety device wherein none of the major movable operating parts of the device such as, for example, the cable drum, the inertia wheel or ratchet wheel and the locking pawls, has translational movement, such parts merely rotating about axes definitely fixed with respect to the device, resulting in a more rugged and dependable device.

Another object of the present invention is to provide a novel inertia-operated safety device wherein the locking of the device is initiated by a relative rotational movement between the cable reel and the inertia member.

Another object of the present invention is to provide an inertia-operated safety device in which the flywheel heretofore used has been eliminated and the necessary mass for inertia operation has been provided in a remaining movable member of the device.

Still another object of the present invention is to provide a novel safety device of the inertia-operated type wherein the ratchet wheel utilized to lock the apparatus also serves as the inertia-member in the apparatus.

Still another object of the present invention is to provide a novel safety apparatus wherein the major elements in the device are all statically balanced to prevent locking thereof due to vibratory accelerations.

Still another object of the present invention is to provide a novel safety apparatus of the type wherein the shoulder harness or web is wound directly on the reel or spool of the device.

These and other objects and advantages of this invention will become apparent after perusal of the following description of the embodiments of this invention disclosed in the drawings wherein:

Fig. 1 shows one embodiment of this invention mounted on the rear of a pilot seat and the associated shoulder harness.

Fig. 2 is an elevation view partly in section of one embodiment of the novel safety apparatus, the view being taken from the back of the apparatus with a part of the base section cut away from the device. This view shows the apparatus in its normal or unlocked position.

Fig. 3 is a section view of the apparatus of Fig. 2 taken along section line 3—3 in the direction of the arrows.

Fig. 4 is a section view of the apparatus of Fig. 2 taken along section line 4—4 in the direction of the arrows.

Fig. 5 is a view partly in section of a portion of the apparatus shown in Fig. 2.

Fig. 6 is a partial view of the apparatus shown in Fig. 2, this view disclosing the device at the moment when it automatically locks.

Fig. 7 is an elevation view partly cut away of the novel device of Fig. 2, the view being taken of the top of the cover of the device and including the pilot's manual control lever device.

Fig. 8 is a longitudinal section view of another embodiment of this invention.

Fig. 9 is a side view partly in section of the device shown in Fig. 8 taken along the section line 9—9.

Fig. 10 is a side view of the device taken along the section lines 10—10 in Fig. 8 in the directions of the arrows.

Referring now to Fig. 1, there is shown a view from the side and rear of a pilot's seat 1 of the type found in aircraft. The framework of the seat is metal and is securely fastened to the chassis of the aircraft. Fixedly secured to the side of the seat frame by brackets 2 is a safety belt or strap 3 which extends across the lap of the pilot and is buckled at the midpoint by a conventional-type buckling means. Secured on the lower portion of the back of the seat frame is a novel safety apparatus 4 which embodies the present invention. A small sheathed wire 5 extends through the side of the apparatus 4 to a lever 6 mounted within easy reach of the pilot at the side of the seat frame for providing manual control of this apparatus by the pilot. A wire cable 7 extends through the top of the apparatus and is securely fastened by link 8 to link 9 to which is securely fastened a shoulder strap or harness 11. The two ends of this strap pass through a metal ring or guide 12 fastened to the top of the seat frame, each end passing over a separate shoulder of the pilot and coupling to the lap buckling means.

Briefly explaining this invention with reference to Fig. 1, as the pilot leans forward or sideward in his seat 1 in controlling his craft, the novel apparatus 4 plays out the harness cable 7. When the pilot again relaxes in his seat, the apparatus reels the cable in, thus keeping the shoulder harness 11 taut. However, if the pilot is thrown from the seat in any direction in a violent motion, the apparatus automatically operates to lock the cable 7 and prevent it from reeling out, thus restraining the pilot in the seat. In the present embodiment, the cable 7 will be locked before it has traveled one half inch at an excessive rate determined by the setting of the device 4. Assuming the pilot had been leaning forward at the time the violent motion occurred, in which position the cable 7 is extended, when the pressure of the pilot's body on the shoulder harness relaxes, the apparatus reels that much of the cable that was extended back into the apparatus. The pilot, by means of lever 6, may also manually lock or unlock the cable when he so desires. A more complete and detailed explanation of the operation of this novel apparatus will be subsequently given.

The novel apparatus disclosed in Figs. 2 through 7, inclusive, which embodies this invention comprises a metallic case as of aluminum alloy made up in two sections, a base-section 13 and a cover section 14 adapted to be fastened together by screws 15. Holes 15' are used to fasten the apparatus 4 to the seat frame. Proper alignment of the base 13 and cover 14 is insured by dowel pins 16. Located within a central raised portion of the inside surface of the base 13 is a cylindrical recess 17 which serves as a bearing surface for one end of the cable reel shaft 18. The hollow cylindrical shaft 18 is fixedly secured within a bore in the cable reel or drum 19. Secured in the cable reel is a pivot pin 21 on which is rotatably mounted a lever arm or drive link 22, one end of which extends through an opening 23 in the side of the drum shaft 18.

A depression 24 is located in the side of the drum in which the ball terminated end of the cable 7 is adapted to fit, the ball 7' fitting under a conforming projection 26 on the drum. The cable 7 fits into a channel in the side of the drum extending from the depression 24 to the outer periphery of the drum, the cable then being wound around the outer periphery of the drum. The cable is securely held down within the channel by a small screw 25 which extends over the cable.

In addition to projection 26 there are three other angularly spaced projections 27, 28, and 29 extending from the side of the cable reel end integral therewith, these four projections being spaced approximately 90° apart around the drum.

An annular ratchet wheel 32 having recesses 33, 34, 35 and 36 cut into the periphery of the central opening therein is mounted on the cable reel in side-by-side relationship, the recesses 33, 34, 35 and 36 accommodating the projections 26, 27, 28 and 29, respectively, on the cable reel, the projections serving to limit the angular movement of the ratchet wheel with respect to the cable reel. Thus, the recesses have a greater arch length than the projections and thus a small relative rotational movement between the cable reel and the ratchet wheel is permitted. In this particular embodiment, the angle of relative rotational movement is about 5°. Another recess 37 in the ratchet wheel 32 accommodates the outer end of the drive link 22. The ratchet wheel 32 is prevented from moving axially away from the cable reel by retaining screws 38 embedded in the reel, the heads of the screws being spaced slightly from the side surface of the ratchet wheel.

The central bore in the cover 14 is arranged to slip over the end of hollow shaft 18 and serves as a bearing therefor. A spiral power spring 39 encircles the hub portion 41 of the cover 14, the inner end of the spring 39 being secured in the hub 41 while the outer end is removably secured to a dowel pin 42 extending from the side of the cable reel 19.

Fixedly secured in axial alignment within the hollow shaft 18 is an annular support member 43 having an annular channel 44 therein (Figs. 3 and 5). A rock shaft 45 having a substantially Y-shaped cross-section is movably positioned within the hollow shaft 18, the annular flanged outer edge 43' of the rock shaft being positioned within the channel 44 in the support member 43. The drum shaft 45 is held in the position shown in Fig. 3, i. e., with the flanged edge pressed into the channel 44, by the spring-loaded tripping lever system which comprises the pin 46, the inner end of which engages the base of the cup-like depression in the rock shaft 45, the outer end being fixedly secured in one end of rocker arm 47 (Fig. 7). The rocker arm 47 is rotatably mounted at approximately its center on a pivot pin 48 which is secured to the outside of the cover 14 by screws 49. Pivotally connected to the opposite end of the rocker arm 47 by a pivot pin 51 carried by the arm is a pin 52, the outer end of which is of reduced diameter and extends through an aperture in a sear 53 (Fig. 4). The sear 53 is turnably mounted at one end on pivot pin 54 and is spring-loaded by spring 55 in such manner that it tends to rotate about the pivot pin 54 in a counter-clockwise direction as viewed in Fig. 4. The other end of spring 55 is attached in a screw member 55' which may be adjusted to control the tension of the tripping lever system. The free end of the sear 53 has a small button or protrusion 53' thereon adapted to engage a finger 56 on the automatic locking pawl 57.

The pawl 57 is rotatably mounted on pivot pin 58 which is fixedly secured in the base 13. The pawl 57 is tensioned to rotate clockwise as viewed in Fig. 2 by the spring 59. An integral finger 61 extends from the pawl 57 and is arranged to be engaged by the release member 62 as subsequently explained.

A manual locking pawl 63 is pivotally mounted in the base 13 and is spring loaded for clockwise rotation (Fig. 2) in the same manner as pawl 57. A finger 64 extends from the pawl 63 to engage the inner end of the release member 62.

A floating washer 60 is positioned in a slightly oversized recess 60' in the base portion 13, the cable extending through the central opening in the washer. This washer allows free movement of the cable into and out from the safety device but prevents dust and dirt from entering.

A detailed description of the operation of this novel device embodying the present invention will now be given with reference to its use by a pilot in an aircraft. The apparatus is shown in its normal operating position in Figs. 2, 3, 4, and 7, that is to say, when it has not been manually or automatically locked. As the pilot moves about in his seat to control his craft, his shoulder harness likewise moves and pulls on the cable 7. The cable unwinds from the cable reel 19, the reel rotating counter-clockwise (Fig. 2) and with it the integral shaft 18. As the reel rotates, it carries the drive link 22 with it since the drive link is mounted on the cable reel by pin 21. The outer end of the drive link 22 engages the side wall of the recess 37 in the ratchet wheel 32 and thus the ratchet wheel is rotating along with the cable reel as it rotates counter-clockwise. The drive link 22 is restrained from rotating during these normal movements due to the spring-loading impressed thereon from the spring 55 through the tripping-lever system including the rock shaft 45. In winding up, when the force is relaxed on the cable 7, the power spring 39 rotates the cable reel 19 clockwise (Fig. 2), and, since the right-hand surface of projection 27 bears against the side of recess 34 and the left-hand side of projection 29 bears against the side of recess 36, the cable reel 19 drives the ratchet wheel 32.

Should the pilot desire to safely secure himself in the seat when, for example, a crash is imminent, he operates the lever device 6 to move the wire 5 to the right looking at Fig. 2. The release member 62 which is fixedly secured on the end of the wire 5 moves to the right and thus the manual pawl 63 is allowed to rotate clockwise under compulsion of its associated spring 92 and engage the ratchet wheel teeth. The projections 26, 27, 28 and 29 all engage surfaces in the recesses 33, 34, 35, and 36 in the locked ratchet wheel and thus the cable reel is prevented from paying out cable. If the pilot manually locks the cable 7 while leaning forward, the power spring 39 will still rotate the cable reel clockwise when the pilot sits back to thereby reel in the slack, the pawl 63 falling in behind each successive ratchet tooth.

To release from manual locking and return the apparatus to its normal position, the pilot operates the lever device 6 to move the wire 5 to the left, the member 62 rotating the pawl 63 away from engagement with the teeth of the ratchet wheel 32.

The novel apparatus of this invention will automatically operate to lock up the cable 7 during crashes and the like if the pilot does not manually lock it. In this case, the release member 62 would be in the position shown in Fig. 2. This safety device is so arranged that when any loading on the cable 7 of an acceleration of a particular number of G's or over occurs, this cable 7 will be locked up. Assume that the aircraft in landing strikes an object and decelerates rapidly, pitching the pilot forward in his seat, or should the craft yaw or descend suddenly so that the pilot's body exerts a loading of this particular number of G's acceleration on the cable 7. When the sharp jerk occurs on the cable 7, it tends to rotate the cable reel 19 at a rapid rate of acceleration. The drive link 22 tends to rotate the ratchet wheel 32 along with the cable reel but this ratchet wheel is made of a relatively heavy metal mass, and it tends to remain stationary when the force is first applied. This tendency of the ratchet wheel to remain stationary overcomes the spring-loading force on the tripping-lever system. There is, therefore, a relative rotational movement between the cable reel 19 and the ratchet wheel 32 and this causes the drive link 22 to pivot or turn in a clockwise direction as viewed in Fig. 2. The inner end of the drive link 22, in passing through its arc of movement, moves the base leg of the rock shaft 45, causing the rock shaft to rock or cant on its flange 43' and ride up within the shaft 18. This is better shown in Fig. 5. The pin 46 is thus made to move to the right as viewed in Fig. 3, tilting the rocker arm 47. This movement of the rocker arm 47 moves the pin 52 to the left as viewed in Fig. 4, thus rotating sear 53 about its pivot pin 54 against the tension of spring 55. The sear button 53' is thus disengaged from the finger 56 and the pawl 57 rotates under pressure of spring 59 to engage the ratchet teeth and thus locks the ratchet wheel 32. Fig. 6 discloses the apparatus at the moment of automatic locking. Only that much of the device needed to show this operation is disclosed.

In this automatically-locked position, the apparatus will still reel in cable in the same manner as explained above when manually locked.

The spring 55 is utilized to control the exact number of G's of acceleration on the cable which are necessary to automatically lock this safety device. The spring tension is transmitted through the tripping lever system to the rock shaft 45 and it determines the amount of force necessary to tip the rock shaft 45. The components of this safety device may be selected as to size, weight, etc., so that the device may cover wide ranges of accelerations. In one embodiment of this device constructed, the locking acceleration was set at 2 G's.

To release from the automatic lock position, the pilot moves the lever device 6 such that wire 5 and member 62 move to the right as viewed in Figs. 2 and 6. The member 62 engages the finger 61 on pawl 57 and rotates it counter-clockwise until the sear button 53 can drop down and engage the right hand side of finger 56 as seen in Fig. 2. The wire 5 and member 62 are then moved back to the left to the position shown in Fig. 2.

It should be noted that the cable reel and the ratchet wheel are statically balanced as are the drive link 22 and the rocker arm 47 to prevent false operation of this device due to vibratory accelerations.

Several novel features of this device should be emphasized at this point. From reading the above description of this embodiment, it is evident that the ratchet wheel 32 serves not only to lock the cable reel by engagement with the pawls 63 or 57, but also serves as the inertia member or weighted mass which resists rapid acceleration thereof, thus eliminating one element from earlier devices, thereby reducing the possibility of failure as well as reducing the cost.

It should also be noted that movements of the major and larger elements of the device, for example, the cable reel and the ratchet wheel, are all rotational, there being no translational movement whatsoever. This insures that the device will never operate due to accelerations or decelerations of the moving vehicle in any direction whatsoever but will only operate due to accelerations of the cable and connected passenger or pilot. In this regard it is well to underline the point that this device works only when a body capable of rapid acceleration with respect to the vehicle is coupled to the device. If a device is not in use, i. e., coupled to a pilot through his shoulder strap, the device will never automatically lock up regardless of the movements of the vehicle.

Another novel feature of this invention is the apparatus which permits the cable to be easily removed from the device for repair or replacement. By removing the cover 14 and taking the cable reel 19 from the base 13, the cable 7 may be removed by loosening the screw 25 and slipping the ball termination from under the projection 26.

Figs. 8, 9 and 10, illustrate another embodiment of the present invention wherein the straps or web of the shoulder harness are directly wound on a reel without use of an intermediate cable. This type of device is desirable in some instances of use of these safety devices and can be mounted at the top of the pilot's seat back as is desirable for certain types of ejection seats.

The harness reel is elongated to accommodate the strap 70, one end of the strap being secured on the reel 71, and wound thereon due to the tension provided by the power spring 72. One end of the power spring is secured in the reel 71 while the other end is fastened to a dowel pin 73 extending from the stationary end cap 74. The harness reel 71 is fixedly secured on the hollow shaft 75 in which is mounted a rock shaft 76 as in the previously described embodiment. As seen in Fig. 9, the locking mechanism, which includes the ratchet wheel 77 having recesses therein to accommodate the projections 78 on the reel 71, the associated drive link 79, the sear 81, the automatic pawl 82 and the manual pawl 83, the release member 84, etc. all correspond to and operate in the same manner as similar elements in the above described embodiment, and further explanation is not necessary.

The right-hand end of the reel 71 has a slot 84 therein in which a rectangular shuttle 85 is movably fitted. A pin 86 is fixedly secured in one end of the shuttle 85, the pin 86 being adapted to fit into a spiral slot 87 in the end cap 88 which is fixedly secured with respect to the end cap 74, both end caps forming part of a body or casing (not shown). As the cable reel 71 rotates, the shuttle 85 and pin 86 rotate therewith and, since the pin follows the spiral slot, the pin and associated shuttle move back and forth in the guide slot. The pin and the inner and outer ends of the spiral slot 87 thus determine the extent of rotation of the cable reel, the pin stopping the reel as it engages the ends of the spirial slot.

It is obvious that equivalents may be used in these above disclosed embodiments and for that reason it should be understood that when, for example, the terms "cable" or "strap" are used in the claims they are meant to encompass cable, straps, wires, ropes, etc.

Since many changes could be made in the above construction of the safety devices and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A safety device for mounting in a vehicle to restrain the movement of a body within the vehicle when the body is subjected to relatively high acceleration movement relative to the vehicle comprising a cable adapted to be coupled to the body, a cable reel rotatably mounted in said device, resilient means coupled to said reel for rotating said reel in one direction to wind up said cable, said reel rotating in the other direction to unwind the cable responsive to forces exerted by a pull on the cable, an inertia member rotatably mounted in said device, said inertia member rotating in unison with said reel during rotation thereof in the unwind direction below a predetermined acceleration, said reel rotating relative to said inertia member during rotation of said reel at the predetermined acceleration due to an abnormal acceleration of the cable, and means operated in response to the relative rotation between the reel and inertia member for stopping rotation of said reel in the unwind direction to thereby restrain movement of the body in the vehicle.

2. A safety device for mounting in a vehicle to restrain the movement of a body within the vehicle when the body is subjected to relatively high acceleration movement relative to the vehicle comprising a casing adapted to be mounted in the vehicle having a cable reel rotatably mounted therein, a cable on said reel adapted to be coupled to the body, resilient means coupled to said reel for rotating said reel in one direction to wind up said reel, said cable reel rotating in the other direction to permit unwinding of the cable responsive to forces exerted by a pull on the cable, an inertia member mounted therein having rotational movement relative to the reel, a drive link pivotally mounted on said reel and coupled to the inertia member, means for yieldably urging said drive link into one position relative to said reel and in engagement with said inertia member for causing said member to rotate with said reel during rotation thereof in the unwind direction below a predetermined acceleration, said drive link yielding and moving to a second position during relative rotation between the reel and the member when said reel rotates at said predetermined acceleration, and means coupled to said drive link and operated thereby when in said second position relative to the reel for stopping rotation of the reel to thereby restrain movement of the body in the vehicle.

3. A safety device as claimed in claim 2 wherein said inertia member has ratchet teeth thereon and including means coupling said member to said reel so as to permit only limited rotational movement of the reel relative to the member, and wherein said reel stopping means includes a pawl arranged to be operated from the drive link for engaging said inertia member to stop said member and thus stop said reel after said limited rotational movement therebetween.

4. A safety device for mounting in a vehicle to restrain the movement of a body within the vehicle when the body is subjected to relatively high acceleration movement relative to the vehicle comprising, in combination, a base adapted to be secured in the vehicle, a cable reel rotatably mounted on said base, a cable on said reel adapted to be coupled to the body, resilient means coupled to said reel for rotating said reel in one direction to wind up said reel, said cable reel rotating in the other direction to permit unwinding of the cable responsive to forces exerted by a pull on the cable, an inertia member rotatably mounted on said reel, means for yieldably coupling said cable reel to said inertia member so that rotation of the reel will produce rotation of the member when the reel rotates under a predetermined value of acceleration, the coupling means yielding when said reel rotates at said predetermined acceleration, and means operated by said coupling means upon yielding to stop rotation of said reel to thereby restrain movement of the body in the vehicle.

5. A safety device for mounting in a vehicle to restrain the movement of a body within the vehicle when the body is subjected to relatively high acceleration movement relative to the vehicle comprising a cable adapted to be coupled to the body, a rotatably mounted cable reel having said cable secured thereon, resilient means coupled to said reel for rotating said cable reel in a direction to wind said cable on said reel, said reel rotating in the opposite direction to unwind said cable therefrom due to forces exerted by a pull on the cable, a rotatably mounted inertia member, means for yieldably coupling said inertia member to said reel to thereby cause said member to rotate with said reel during rotation in said unwind direction below a certain acceleration, said means yielding during rotation at said certain acceleration to cause said reel to rotate relative to said inertia member, and means associated with said coupling means operated when said reel rotates relative to said inertia member for stopping rotation of the reel in said unwind direction.

6. A safety device as claimed in claim 5 including a casing enclosing said device and having an opening therein, an annular recess in the walls of said opening, a washer loosely mounted in said recess extending across said opening, the outer diameter of said washer being somewhat smaller than the diameter of said recess to provide lateral movement of the washer in the recess, one end of said cable extending out from said casing through the central opening in the washer, the floating washer permitting unhindered ingress, egress, and lateral movement of the cable while preventing foreign matter from entering the casing.

7. A safety device comprising a casing having a hollow cylindrical shaft rotatably mounted therein, a reel fixedly mounted on the shaft, an inertia member rotatably mounted in the device co-axial with the reel and having ratchet teeth therein, means coupled to said reel and member for permitting a limited rotational movement of the inertia member relative to the reel, a drive link coupled to the reel and the inertia member extending into the hollow shaft, the drive link being pivotally movable responsive to said limited movement, a rock shaft mounted within the hollow shaft, said rock shaft engaging said drive link whereby the pivoting of said drive link tilts said rock shaft, a rocker arm pivotally mounted on said device, one end of said arm coupled to said rock shaft, the arm pivoting upon tilting of the rock shaft, a sear pivotally mounted in the device and coupled to the opposite end of the arm, the sear being pivoted upon pivoting of the arm, and a pawl mounted in said device and coupled to the sear, the pawl being operated upon pivoting of said sear to engage the ratchet teeth on said inertia member.

8. A safety device comprising a cable, a cable reel rotatably mounted therein adapted to rotate in one direction to wind up said cable and in the other direction to unwind the cable, a plurality of projections on the side of the reel, a weighty ratchet wheel having recesses therein adapted to accommodate the projections whereby the ratchet wheel is mounted on said reel for rotation with the reel, the recesses being slightly larger than the projections to permit a limited rotational movement of the ratchet wheel relative to the reel, a drive link pivotally mounted on said reel and engaging the ratchet wheel, means for yieldably urging said drive link into one position relative to said reel for driving said ratchet wheel in rotational movement in unison with said reel during rotation of the reel in the unwind direction below a predetermined acceleration, said reel rotating relative to the weighty ratchet wheel during rotation of the reel at the predetermined acceleration, the relative rotation of the reel and ratchet wheel pivoting said drive link to a second position, a pawl operable to engage said ratchet wheel to prevent rotation thereof and of the reel, and means coupled to said drive link and operated thereby on movement to said second position to release said pawl and lock said ratchet wheel.

9. A safety device as claimed in claim 8 including a manually operated release means for disengaging the pawl from the ratchet wheel.

10. A safety device as claimed in claim 8 including a second pawl manually operable to engage or disengage said ratchet wheel to control rotation of the ratchet wheel and associated cable reel in the unwind direction.

11. A safety device comprising a strap adapted to be coupled to a body in a moving vehicle, a rotatably mounted elongated strap reel having the strap coupled thereto, resilient means for rotating said strap reel in a direction to wind the strap on the reel, said reel rotating in the opposite direction responsive to a pull on the strap by the body, a relatively weighty ratchet wheel, means for mounting said wheel on one side of said reel adapted to permit a slight rotational movement of the reel relative to the wheel, a drive link pivotally mounted on said reel and yieldably engaging said ratchet wheel to cause said wheel to rotate with said reel during rotation in said unwind direction below a certain acceleration, said drive link yielding to pivot during rotation of the reel in said unwind direction at said certain acceleration due to the reluctance of the ratchet wheel to rotate with the strap reel, a pawl operable to engage the ratchet wheel and stop rotation thereof and thus stop rotation of the associated strap reel, and means coupling said drive link to said pawl to cause said pawl to operate and engage said wheel responsive to said pivoting of the drive link.

12. A saftey device as claimed in claim 11 wherein a slot is located in the other end of the strap reel and including a shuttle mounted in the slot and adapted to move longitudinally therein, a pin secured in the shuttle, and an end plate having a spiralling slot therein adapted to accommodate the pin fixedly mounted adjacent to said other end of the strap reel.

13. A safety device as claimed in claim 11 including manually operable means for disengaging said pawl from said ratchet wheel.

14. A safety device as claimed in claim 11 including a second pawl adapted to engage the ratchet wheel, and manually operable means for engaging and disengaging the second pawl and the ratchet wheel.

References Cited in the file of this patent

UNITED STATES PATENTS

| | | |
|---|---|---|
| 1,308,480 | Caouette | July 1, 1919 |
| 1,744,461 | Foss | Jan. 21, 1930 |
| 2,324,324 | Rutledge | July 13, 1943 |
| 2,403,653 | Geohegan et al. | July 9, 1946 |
| 2,434,119 | Nordmark | Jan. 6, 1948 |
| 2,701,693 | Nordmark et al. | Feb. 8, 1955 |
| 2,708,555 | Heinemann et al. | May 17, 1955 |

FOREIGN PATENTS

| | | |
|---|---|---|
| 18,358 | Great Britain | Aug. 14, 1911 |